United States Patent [19]

Campbell et al.

[11] 4,278,457
[45] Jul. 14, 1981

[54] HYDROCARBON GAS PROCESSING

[75] Inventors: Roy E. Campbell; John D. Wilkinson, both of Midland, Tex.

[73] Assignee: Ortloff Corporation, Midland, Tex.

[21] Appl. No.: 815,542

[22] Filed: Jul. 14, 1977

[51] Int. Cl.³ .............................................. F25J 3/02
[52] U.S. Cl. ............................................ 62/24; 62/38
[58] Field of Search ................... 62/28, 27, 23, 24, 38, 62/39

[56] References Cited

U.S. PATENT DOCUMENTS

| | | | |
|---|---|---|---|
| 2,557,171 | 6/1951 | Bodle et al. | 62/39 |
| 3,292,380 | 12/1966 | Bucklin | 62/23 |
| 3,292,381 | 12/1966 | Bludworth | 62/38 |
| 3,631,683 | 1/1972 | Tanz | 62/28 |
| 3,656,311 | 4/1972 | Kaiser | 62/28 |
| 3,837,172 | 9/1974 | Markbreiter et al. | 62/38 |
| 3,915,680 | 10/1975 | Crawford et al. | 62/27 |

Primary Examiner—Norman Yudkoff
Attorney, Agent, or Firm—Brumbaugh, Graves, Donohue & Raymond

[57] ABSTRACT

The processing of gas streams containing hydrocarbons and other gases of similar volatility to recover components such as ethane, propane and heavier hydrocarbons from a residue gas containing methane is disclosed. In prior art processes, it has been customary to cool incoming raw feed gas and to separate the desired products by distillation. A part of the needed cooling is obtained by expanding the raw feed gas from a high feed pressure to a lower pressure at which distillation occurs. In the present invention, the raw feed gas is divided into two gaseous streams before expansion. The first stream is expanded in the usual fashion and supplied to the demethanizer as a mid-column feed. The remaining part is cooled to substantial condensation. The condensed stream is expanded and supplied to the demethanizer column above the feed point of the first stream. The split vapor feed provides unexpected advantages in reducing the risk of carbon dioxide icing in the demethanizer column, thus either eliminating or reducing the need for prior $CO_2$ removal. Alternately, without increasing the risk of carbon dioxide icing, ethane recovery can be increased.

7 Claims, 11 Drawing Figures

HYDROCARBON GAS PROCESSING

Ethane and propane can be recovered from a variety of gases, such as natural gas, refinery gas, and synthetic gas streams obtained from other hydrocarbon materials such as coal, crude oil, naphtha, oil shale, tar sands, and lignite. Natural gas usually has a major proportion of methane and ethane, i.e., methane and ethane together comprise at least 50 mole percent of the gas. There may also be lesser amounts of the relatively heavier hydrocarbons such as propane, butanes, pentanes, and the like, as well as $H_2$, $N_2$, $CO_2$ and other gases.

The present invention is generally concerned with the recovery of ethane and propane from such gas streams. A typical analysis of a gas stream to be processed in accordance with the invention would be, in approximate mole %, 80% methane, 10% ethane, 5% propane, 0.5% iso-butane, 1.5% normal butane, 0.25% iso-pentane, 0.25% normal pentane, 0.5% hexane plus, with the balance made up of nitrogen and carbon dioxide. Sulfur-containing gases are also often present.

Recent substantial increases in the market for the ethane and propane components of natural gas has provided demand for processes yielding higher recovery levels of these products. Available processes for separating these materials include those based upon cooling and refrigeration of gas, oil absorption, and refrigerated oil absorption. More recently, cryogenic processes have become popular. These have achieved popularity because of the availability of economical equipment which produces power while simultaneously expanding and extracting heat from the gas being processed. Depending upon the pressure of the gas source, the richness (ethane and heavier hydrocarbons content) of the gas and the desired end products, each of these processes or a combination thereof may be employed.

The cryogenic expansion process is now generally preferred for ethane recovery because it provides maximum simplicity with ease of start up, operating flexibility, good efficiency, safety and good reliability. U.S. Pat. Nos. 3,360,944, 3,292,380, 3,292,381 and 3,595,782 describe relevant processes. In a typical cryogenic expansion process, the feed gas under pressure is cooled in preliminary stages and expanded to a lower pressure and fractionated at the lower pressure. The fractionation separates the desired product (as a bottom product) from the residue gas which is discharged as column overhead vapors.

In the preliminary cooling stages, the raw feed gas is typically cooled by residue gas and by reboiler and side streams from the fractionation column. In addition, external refrigeration may be supplied, particularly if the feed gas contains large amounts of ethane or heavier hydrocarbons.

In cryogenic processing, expansion of the cooled feed gas is relied upon to generate the low temperature required for cryogenic processing. Both turboexpanders and expansion valves have been employed. In recent years, the availability of turboexpanders which simultaneously expand the feed gas and extract work from it have been particularly important. Such devices are desirable because the energy which is extracted from the expanded gas increases the cooling obtained by expansion and can be used to reduce the energy otherwise required to operate the process.

If none of the feed gas is condensed during the preliminary cooling stages, the entire cooled vapor stream is passed through the turboexpander or expansion valve. The expansion causes partial condensation. The expanded stream is thereupon supplied to the fractionation column usually as a top column feed where residual methane is stripped from the condensate. Turboexpanders now on the market are typically capable of utilizing feed gases which carry up to several percent of condensed mist. Such gases may be treated as though not condensed, i.e., without vapor-liquid separation.

When partial condensation of the feed stream has occurred, and the liquid condensate is separated, the vapors remaining from the partial condensation are expanded through the turboexpander or expansion valve. The liquid portion recovered from the partial condensation is flash-expanded to the operating pressure of the demethanizer and supplied as a second column feed. Ordinarily the temperature achieved by expanding the vapors through a work expansion machine such as a turboexpander is significantly lower than the temperature achieved by a flash-expansion of the liquid condensate recovered from the preliminary cooling stages. Accordingly, the expanded vapor will be supplied as the top column feed, while the expanded liquid is supplied as a mid-column feed. However, as described in co-pending application, Ser. No. 728,962, filed Oct. 4, 1976 by Campbell, Rambo and Wilkinson, it is sometimes advantageous to subcool the liquid condensate recovered from the initial partial condensation. When subcooling, the temperature achieved by flash expansion of the liquids can be lower than the temperature achieved by expansion of the vapor stream. In that case, the feed positions would normally be inverted.

In the ideal operation of a demethanizer column, the residue vapors will contain substantially all of the methane found in the feed gas and no hydrocarbons equivalent to ethane or heavier. The bottoms fraction leaving the demethanizer will contain all of the heavier components and essentially no methane. In practice, however, this ideal situation is not obtained, largely for the reason that the conventional demethanizer operates basically as a stripping column. The amount of ethane in the column overhead vapors, therefore, is dependent upon the column top temperature at any given operating pressure. The lower the temperature at the top of the demethanizer column, the less volatile the ethane, and accordingly, the greater the amount of ethane recovered by the process.

However, natural gases subjected to cryogenic processing usually contain carbon dioxide, often in amounts significantly in excess of 0.02 mole percent (based on the feed). In many cases, the carbon dioxide content of the feed gas may be in the order of ½ to 2% or more. When an attempt is made to increase ethane recovery by reducing the column overhead temperature, serious risks can be encountered arising out of the tendency of carbon dioxide to form ice or solidify on the interior parts of the column. The carbon dioxide icing problem is exacerbated if the demethanizer column is designed to produce a $C_2+$ product containing less $CO_2$ than would normally occur if the demethanizer is operated to meet a desired $C_1/C_2$ ratio. Operating the column in such a manner tends to cause carbon dioxide concentrations within the column to rise in the colder stages of the demethanizer; indeed, the $CO_2$ concentration may rise above the concentration of the carbon dioxide in the feed gas or either product stream. Problems of this character may arise, for example, where it is necessary to limit the $CO_2$ concentration in the bottoms product to below 2% by weight; however, whether or not icing occurs can be influenced by other factors such as the $CO_2$ content of the feed gas, and the amount of $C_2+$ gases contained in it. For some purposes, even when the feed gas contains as little as 0.02% $CO_2$, $C_2+$ product having as little as 0.1% $CO_2$ may be desired. The prior art has suggested only that where ethane containing less than about 1/10% carbon dioxide is desired, demethanizer top pressure and temperature should be raised; see Bucklin U.S. Pat. No. 3,595,782. While increasing column temperature and pressure will reduce the danger of $CO_2$ icing, ethane recovery will be lower because the volatility of methane and $CO_2$ relative to ethane is less at higher pressures and temperatures.

In accordance with the present invention, it has been found that the $CO_2$ icing problem can be materially mitigated by splitting the vapor stream to the demethanizer column into two portions. Surprisingly, this reduces the risk of $CO_2$ icing without increasing column overhead temperature, so that ethane recovery is not adversely affected. In fact, the present invention usually makes even lower column overhead temperatures practical, so that ethane recovery can, in some cases, be increased. The present invention is particularly advantageous when processing feed gases under conditions requiring column overhead temperatures in the range of $-125°$ F. or colder. Such conditions, for example, are frequently required to process feed gases having less than 4 gal. of $C_2+$ components per thousand cubic feet of gas for high ethane recovery.

In the practice of this invention, the feed gas is split into two portions. Depending on design convenience, the vapors can be split either before or after the preliminary cooling stages. The first portion of the vapor is cooled to substantial condensation, expanded to the column operating pressure, and supplied as a column feed (usually the top column feed). The second portion is expanded in the normal manner, i.e., through a work expansion machine. This stream is cooled sufficiently prior to expansion so that the column top temperature can be controlled by the column top feed.

In this invention, the column refrigeration is provided by the combined cooling effect of the first and second portions of the split vapor feed. The desired ethane recovery in the demethanizer is related to the column top temperature and the temperature of the top column feed. The higher temperature of the second portion of the vapor stream, when taken in conjunction with the proportion of vapors in that stream, is sufficient to dilute the carbon dioxide concentration in the rising vapors of the demethanizer column and thereby prevent or materially reduce the likelihood of carbon dioxide icing.

In the present invention, the condensed and expanded first portion of the split vapor feed can be supplied as the column top feed. The normally expanded second portion of the split vapor feed will usually be supplied at a lower feed point, such as a mid-column or upper mid-column feed. Condensed liquids (if any occur during partial cooling of the raw feed gas vapors) can be expanded and supplied as a lower mid-column feed. As pointed out above, however, pending patent application, Ser. No. 782,962 to Campbell et al. describes an improvement in cryogenic gas separation processes whereby some or all of the liquids obtained upon partial condensation of the raw feed gas are subcooled and employed as a top column feed, and the expanded vapor stream is used as a mid-column feed. The process of the present invention is generally applicable to the processes such as described in the prior application. In such case, the feed points can be inverted, so that the expanded subcooled liquid will become the top or upper middle column feed and the two vapor streams become, respectively, the upper mid-column or top feed and the lower mid-column feed.

Another improvement in cryogenic gas separation processes is described in co-pending application, Ser. No. 728,963 filed Oct. 4, 1976 by Campbell and Wilkinson. The '963 application relates, inter alia, to a process and apparatus in which a subcooled liquid is flash expanded and supplied as the top feed to the demethanizer. In the '963 application, we have shown that yields can be improved in such a process by enriching the liquid feed stream prior to expansion thereof with a process stream having a bubble point below the bubble point of the liquid being expanded, whereby the refrigerated temperature from expansion is reduced. The technique of the '963 application is applicable to the present invention. For example, in the present invention a raw feed may be cooled and partially condensed and the vapor recovered from partial condensation and split and treated as described above. In such a case, some or all of the liquid from partial condensation can be combined with the vapor portion cooled to substantial condensation and that stream further subcooled in accordance with the technique described in the '963 application.

For a better understanding of the present invention, reference is made to the following examples and drawings. Referring to the drawings.

In the following explanation of the above figures, tables are provided summarizing flow rates calculated for representative processing conditions. In the tables, the values for flow rates (in pound moles per hour) have been rounded to the nearest whole number for convenience. The total stream flow rates shown in the tables include all non-hydrocarbon components, and are generally larger than the sum of the stream flow rates for hydrocarbon components. Temperatures indicated are approximate values rounded to the nearest degree.

Figure 1:
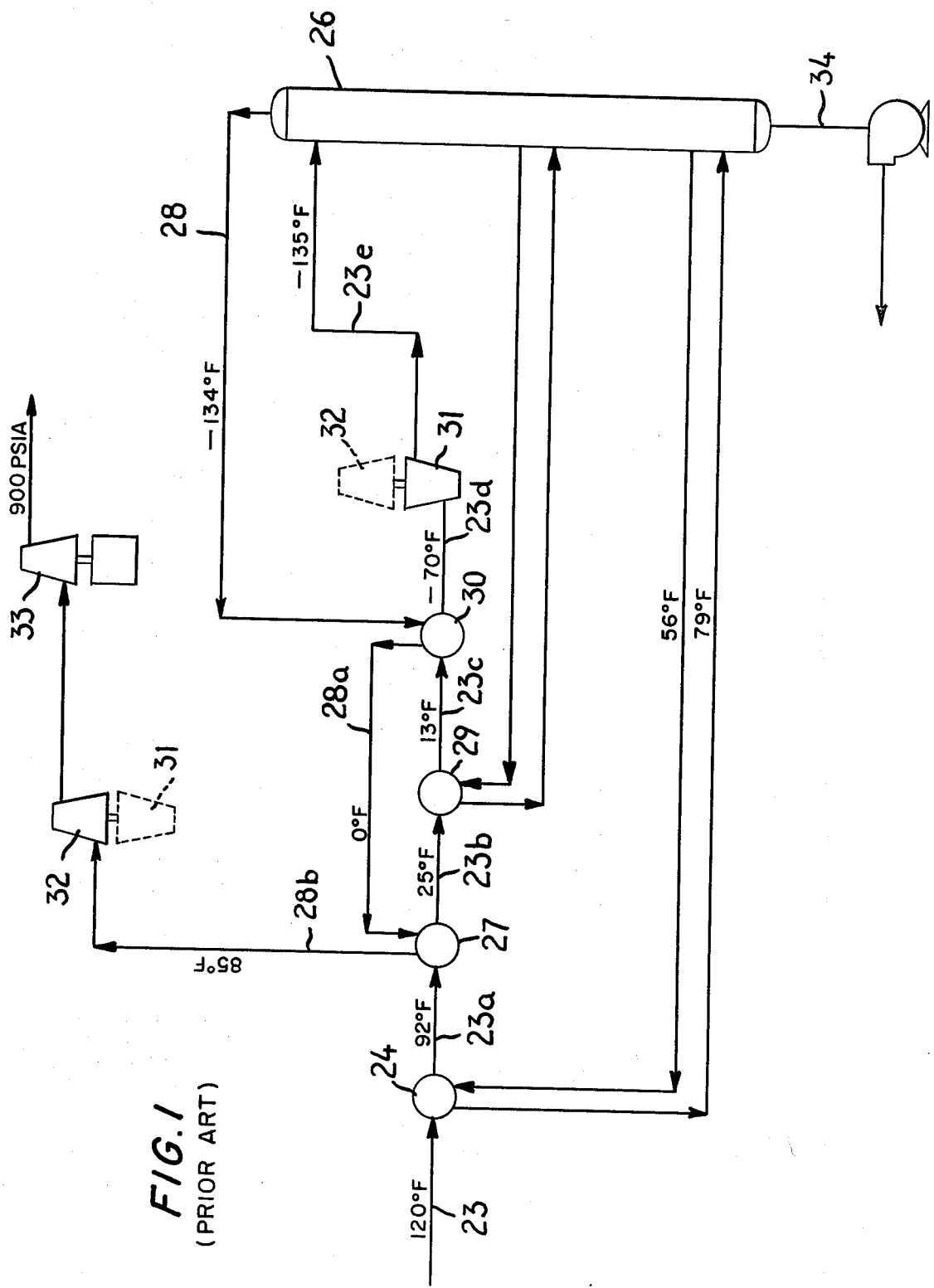
FIG. 1 is a diagram of a conventional single stage cryogenic natural gas processing plant of the prior art incorporating a set of conditions for a typical lean natural gas stream.

Referring to FIG. 1, inlet gas enters the process at 120° F. and 910 psia as stream 23. If the inlet gas contains a concentration of sulphur compounds which would cause the product stream not to meet specifications, the sulphur compounds are removed by appropriate pretreatment of the feed stream (not illustrated). In addition, the feed stream is usually dehydrated to prevent ice formation under cryogenic conditions. Solid dessicant has been used for this purpose. The feed stream is cooled in heat exchanger 24. Exchanger 24 is the reboiler for demethanizer 26. From heat exchanger 24, the partially cooled feed gas stream 23a at 92° F. enters a second heat exchanger 27 where it is further cooled by heat exchange with residue gas stream 28a. The further cooled feed gas 23b leaves heat exchanger 27 at 25° F., and is cooled to 13° F. (stream 23c) in heat exchanger 29. Heat exchanger 29 is a side reboiler on demethanizer 26. Stream 23c is cooled in one further stage to −70° F. (stream 23d) in heat exchanger 30. Cooling in exchanger 30 is derived from residue gas 28. At −70° F. stream 23d contains a small portion of condensed liquid which appears as a mist in the stream. It is sufficiently small that separation of it is unnecessary, and, therefore, the entire stream 23d is treated as cooled vapor. It is expanded from feed pressure (approximately 900 psia) to the operating pressure of the demethanizer 26 (approximately 360 psia) in an expansion engine 31. The engine 31 expands the vapor stream 23d substantially isentropically and discharges the vapor stream 23e at a pressure of 360 psia and temperature of −135° F. The usual commercial expanders are capable of recovering in the order of 80–85% of the work theoretically available in an ideal isentropic expansion.

Stream 23e at −135° F. and 360 psia (and approximately 16% condensed) is supplied as the top feed to the demethanizer 26.

The condensed phase in stream 23e becomes the top liquid feed to the demethanizer column. The top tray of that column typically is a chimney tray, and in many cases, the demethanizer is provided with an enlarged diameter above the top tray, to facilitate vapor-liquid separation. Vapors in stream 23e, together with vapors rising from the demethanizer 26, combine in the top section of the demethanizer to become residue gas stream 28 leaving the demethanizer at −134° F.

The residue gas 28 passes countercurrently to the incoming feed gas in heat exchanger 30 where it is heated to 0° F. (stream 28a) and heat exchanger 27 where it is heated to 85° F. (stream 28b). It is then recompressed in two stages. The first stage of recompression 32 is a compressor driven by the expansion engine 31. The second stage of compression 33 is driven by a supplemental power source and recompresses the residue gas sufficiently to meet line requirements usually in the order of the inlet pressure.

A summary of stream flow rates for the process illustrated in FIG. 1 is set forth in the following table:

TABLE I (FIG. 1)

STREAM FLOW SUMMARY - (LB.-MOLES/HR)

| Stream | Carbon Dioxide | Methane | Ethane | Propane | Butane+ | Total |
|---|---|---|---|---|---|---|
| 23 | 39 | 6,181 | 208 | 70 | 52 | 6,588 |
| 28 | 38 | 6,181 | 75 | 7 | 1 | 6,340 |

TABLE I-continued (FIG. 1)

| | | | | | | |
|---|---|---|---|---|---|---|
| 34 | 1 | 0 | 133 | 63 | 51 | 248 |

HORSEPOWER:
   Refrigeration      0
   Recompression  3,069
       Total  3,069
RECOVERIES:
   Ethane          64.2%
   Propane        89.7%

Figure 2:
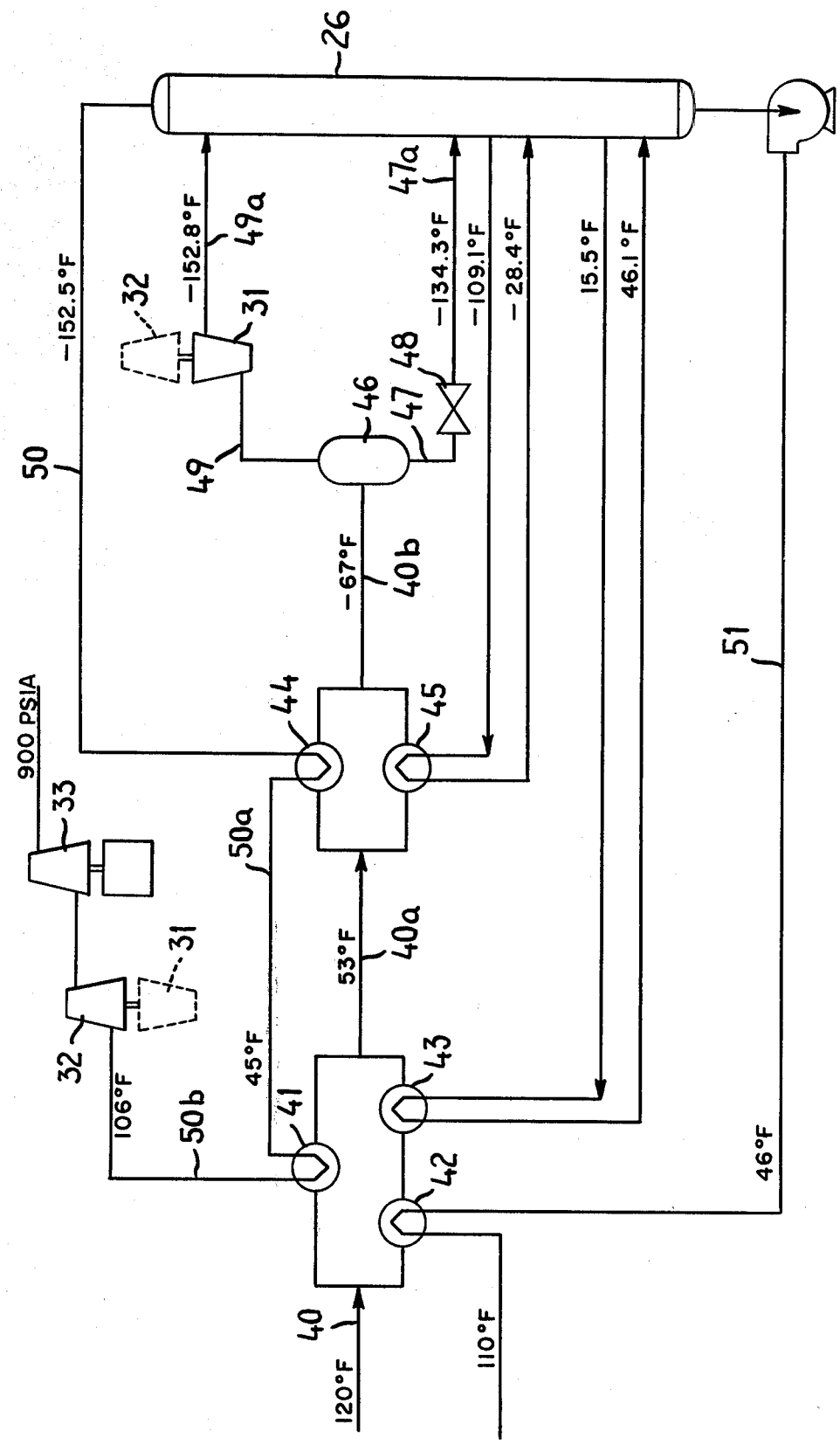
FIG. 2 is a flow diagram of a single stage cryogenic natural gas processing plant of the prior art incorporating a set of conditions for another feed gas stream richer in $C_2+$ components than the stream feed referred to in FIG. 1, but still considered lean.

FIG. 2 represents an alternative prior art process wherein the feed gas, although lean, is richer than the feed gas stream processed in the flow diagram of FIG. 1 and contains a sufficient amount of $C_{2}+$ components that substantial partial condensation will occur during the preliminary cooling stages.

In the process of FIG. 2, raw feed stream 40 enters the process at 120° F. and 910 psia. It is divided into two portions and partially cooled in heat exchangers 41, 42 and 43. The portions are recombined as stream 40a to form a partially cooled feed gas stream at 53° F. The partially cooled streams are divided again and further cooled in heat exchangers 44 and 45. Upon recombining, stream 40b is supplied to a liquid vapor separator 46 at a temperature of −67° F. and a pressure of approximately 900 psia. Liquid from separator 46 (stream 47) is expanded in expansion valve 48 to the operating pressure of demethanizer column 26. In the process of FIG. 2, the demethanizer is assumed to operate at a pressure of approximately 250 psia. The flash expansion of stream 47 produces a cold expanded stream 47a at a temperature of −134° F., which is supplied as mid-column feed. The vapor stream 49 from separator 46 is supplied to the expansion engine 31 wherein the stream is expanded to 250 psia and achieves a refrigerated temperature of about −153° F., stream 49a. Stream 49a is supplied as a top column feed to the demethanizer 26. Residue vapors leaving the top of demethanizer 26, stream 50, pass respectively, through exchangers 44 and 41 to supply a portion of the cooling to the raw feed gas. The warmed residue gas stream 50b leaving exchanger 41 is partially compressed by compressor 32 driven by the expansion engine 31. The partially compressed stream leaving compressor 32 is further compressed to the line pressure of 900 psia in a second compressor 33 driven by an external power source.

Cooling to heat exchanger 45 is supplied by means of a demethanizer side reboiler; cooling to exchanger 43 is supplied by the demethanizer reboiler. The cooling supplied by these two streams warms the liquids from the demethanizer column and provides necessary stripping vapors to operate the demethanizer process. The demethanizer bottoms product stream 51 passes first in heat exchange relation to the incoming raw feed in exchanger 42 and then is withdrawn as $C_{2}+$ product at a temperature of 110° F.

A process flow summary of the process illustrated in FIG. 2 is set forth in the following table:

TABLE II (FIG. 2)

STREAM FLOW RATE SUMMARY - (LB.-MOLES/HR.)

| Stream | Carbon Dioxide | Methane | Ethane | Propane | Butane+ | Total |
|---|---|---|---|---|---|---|
| 40 | 12 | 1,447 | 90 | 36 | 43 | 1,647 |
| 47 | 4 | 280 | 42 | 25 | 39 | 391 |
| 50 | 9 | 1,445 | 19 | 0 | 0 | 1,492 |

TABLE II-continued (FIG. 2)

| 51 | 3 | 2 | 71 | 36 | 43 | 155 |
|---|---|---|---|---|---|---|
| HORSEPOWER: | | | | | | |
| Refrigeration | | | 0 | | | |
| Recompression | | | 1,180 | | | |
| | | Total | 1,180 | | | |
| RECOVERIES: | | | | | | |
| Ethane | | | 79.0% | | | |
| Propane | | | 98.2% | | | |

EXAMPLE 1

Figure 3:
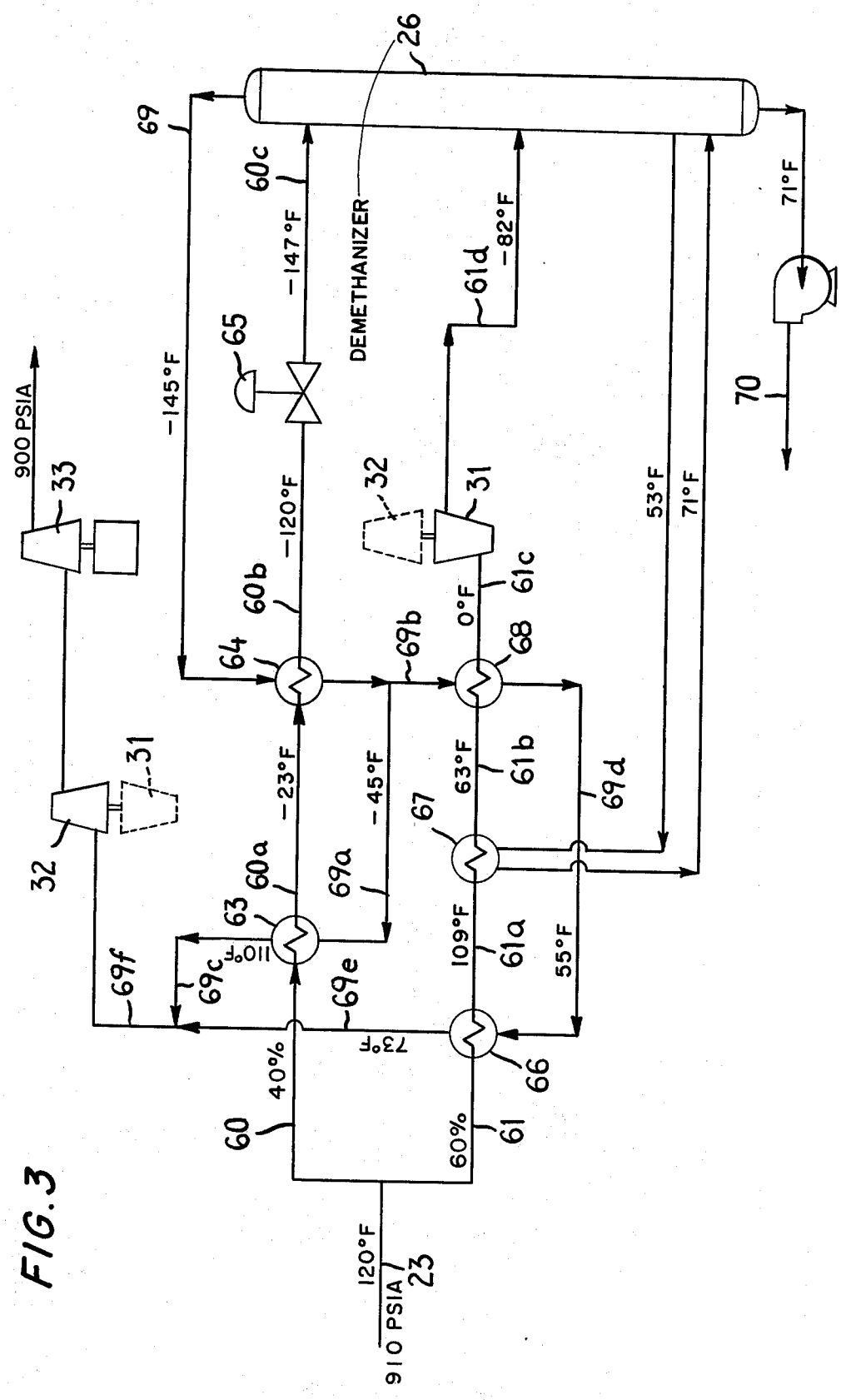
FIG. 3 is a flow diagram of a natural gas processing plant in accordance with the present invention having a split vapor feed.

FIG. 3 illustrates a flow diagram of a process in accordance with the present invention for purposes of illustration. The feed gas processed in the process illustrated in FIG. 3 is the same as the feed gas considered in FIG. 1. Accordingly, the process of FIG. 3 and flow conditions can be compared with the conditions of FIG. 1 to illustrate the advantages of the present invention.

In FIG. 3, raw feed gas enters the process (stream 23) at a pressure of 910 psia and a temperature of 120° F. Feed stream 23 is divided into two branches 60 and 61. Following branch 60, the feed gas is first cooled in heat exchanger 63 to −23° F. (stream 60a). Stream 60a is further cooled in exchanger 64 to −120° F. (stream 60b) at which temperature it is substantially condensed at a pressure in the order of 900 psia. The condensed stream 60b is expanded in expansion valve 65. While an expansion valve is preferred, an expansion engine may be substituted. Upon expansion, it flashes to the operating pressure of the demethanizer column 26 (360 psia). At this pressure, the feed stream 60c achieves a temperature of −147° F. and is supplied to the demethanizer as the top column feed.

Branch 61 of the feed gas is first cooled in exchanger 66 to the temperature of 109° F. (stream 61a). Further cooling occurs in exchanger 67 where it is cooled to 63° F. (stream 61b) and still further cooling occurs in exchanger 68 wherein it is cooled to 0° F. (stream 61c). Stream 61c, at 0° F. and approximately 900 psia, is expanded in a conventional expansion engine 31 to the demethanizer operating pressure of 360 psia. The expanded stream 61d reaches a temperature of −82° F. and is supplied as a mid-column feed.

Residue gas from the top of demethanizer 26 (stream 69) is employed to provide cooling for both branches 60 and 61 of the feed gas. The residue gas stream 69 at −145° F. first supplies cooling to heat exchanger 64. Thereafter, it is divided into streams 69a and 69b; stream 69a at −45° F. supplies cooling to heat exchanger 63. Branch 69b supplies cooling to heat exchanger 68 and then (stream 69d) to heat exchanger 66. The warmed stream 69e joins stream 69c and the combined stream 69f is partly recompressed in the compressor 32 driven by expansion turbine 31. The partly compressed stream from compressor 32 is further compressed to the line pressure of 900 psia in the compressor 33 driven by an external power source.

The demethanizer reboiler is employed to supply cooling to stream 61a in heat exchanger 67.

A stream summary flow for the process of FIG. 3 is set forth in the following table:

TABLE III (FIG. 3)

STREAM FLOW SUMMARY - (LB.-MOLES/HR)

TABLE III-continued (FIG. 3)

| Stream | Carbon Dioxide | Methane | Ethane | Propane | Butane+ | Total |
|---|---|---|---|---|---|---|
| 23 | 39 | 6,181 | 208 | 70 | 52 | 6,588 |
| 60 | 16 | 2,472 | 83 | 28 | 21 | 2,635 |
| 61 | 23 | 3,709 | 125 | 42 | 31 | 3,953 |
| 69 | 38 | 6,181 | 28 | 2 | 1 | 6,288 |
| 70 | 1 | 0 | 180 | 68 | 51 | 300 |

| HORSEPOWER: | | |
|---|---|---|
| Refrigeration | | 0 |
| Recompression | | 3,120 |
| | Total | 3,120 |
| RECOVERIES: | | |
| Ethane | | 86.3% |
| Propane | | 97.2% |

Figure 4:
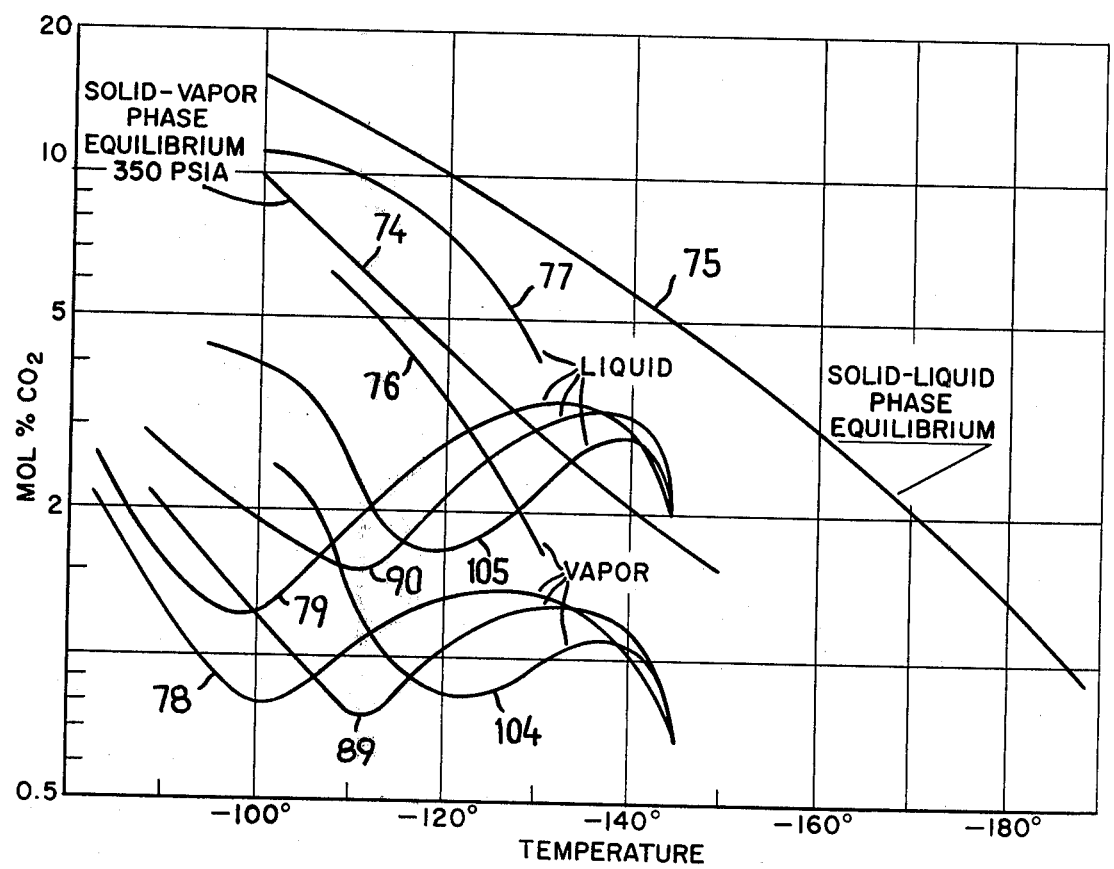
FIG. 4 is a $CO_2$-temperature diagram showing the effect of the present invention.

The effect of splitting the vapor feed on carbon dioxide icing is seen from FIG. 4. FIG. 4 is a graph of the relation between carbon dioxide and temperature. Lines 74 and 75 on FIG. 4 represent the equilibrium conditions for vapor and liquid, respectively (see, "Short Cut to $CO_2$ Solubility" by Warren E. White, Karl M. Forenczy and Ned P. Baudat, *Hydrocarbon Processing*, V. 52, pp. 107–108 (August, 1973). A vapor or liquid temperature on or to the right of these lines, or a carbon dioxide concentration on or above these lines, signifies an icing condition. Because of the variations which normally occur in gas processing, it is usually desired to design a demethanizer with a substantial safety factor between the expected conditions and the icing conditions.

Also plotted in FIG. 4 are lines representing a vapor and liquid condition (lines 76 and 77, respectively) in the demethanizer of base case FIG. 1. For the base case, there is a safety factor of only about 1.14 between the anticipated operating conditions and the icing conditions. An increase in the carbon dioxide content of the gas of only 14% could cause icing.

By contrast, when the vapor is split and treated in accordance with the present invention, the demethanizer conditions for the process of FIG. 3 are represented by vapor line 78 and liquid line 79, giving a safety factor of 1.88.

The improvement, moreover, is obtained with a marked improvement in ethane recovery. The base case recovers only 64.2% of the ethane, while the process of FIG. 3 recovers 86.3% of the ethane.

The process of FIG. 3 requires more horsepower than the process of FIG. 1. The increase in horsepower requirement is the result of the greater ethane recovery in the process of FIG. 3. It should be noted that the process of FIG. 3 is actually more efficient in horsepower utilization than the process of FIG. 1. This can be seen by considering a modification of the process of FIG. 1 in which external refrigeration is provided to reduce column overhead temperature and increase ethane recovery. Even when the amount of horsepower for refrigeration plus recompression equals or exceeds the horsepower required for the process of FIG. 3, the ethane recovery obtained in the process of FIG. 1 will be less than the ethane recovery obtained in the process of FIG. 3. Moreover, if one attempts to increase the ethane in recovery in the process of FIG. 1 by reducing the column top temperature, there will be a material increase in the risk of icing which would make the process inoperative.

EXAMPLE 2

Figure 5:
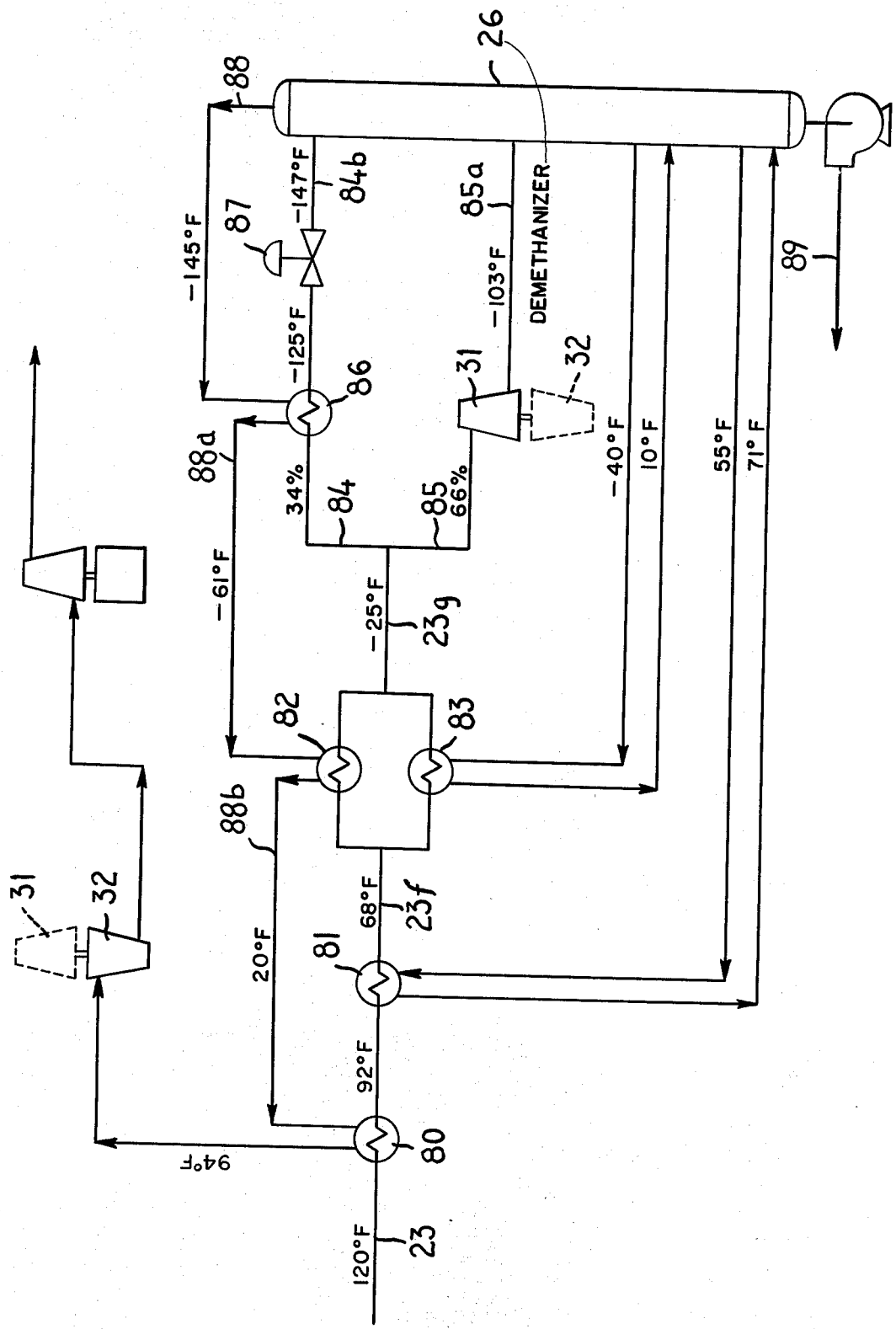
FIGS. 5, 6 and 7 are flow diagrams of additional natural gas processing plants in accordance with the present invention.

FIG. 5 sets forth a flow diagram for a modification of the process described in FIG. 3 (Example 1) in which a somewhat smaller proportion of the feed gas vapor is condensed and supplied as a top column feed. In the process of FIG. 3, approximately 40% of the feed gas stream was condensed and supplied as top column feed in stream 60 and 60% was expanded through expansion engine 31 and supplied as a mid-column feed. In a process of FIG. 5, only 34% of the feed gas is supplied as top column feed.

The change in the portions modifies the optimum arrangement of heat exchangers employed for recovery of refrigeration used in cooling the incoming raw feed. Thus, incoming raw feed 23 is cooled in heat exchanger 80 by residue gas stream 88b and in heat exchanger 81 by the demethanizer reboiler. The feed gas stream 23f at 68° F. is then split and further cooled in heat exchanger 82 by residue gas stream 88a and in heat exchanger 83 by demethanizer side reboiler.

The recombined stream 23g at −25° F. is split into two branches, 84 and 85, respectively, containing 34% and 66% of the feed gas. Branch 84 is condensed in heat exchanger 86 by residue gas stream 88, flashed through expansion valve 87 and supplied (as stream 84b) at −147° F. as the demethanizer top feed. Branch 85 is expanded through expansion engine 31 and supplied (stream 85a) as mid-column feed at −103° F.

A stream flow summary for the process of FIG. 5 is set forth in the following table:

TABLE IV
(FIG. 5)

STREAM FLOW SUMMARY - (LB.-MOLES/HR.)

| Stream | Carbon Dioxide | Methane | Ethane | Propane | Butane+ | Total |
|---|---|---|---|---|---|---|
| 23 | 39 | 6,181 | 208 | 70 | 52 | 6,588 |
| 84 | 13 | 2,101 | 71 | 24 | 18 | 2,240 |
| 85 | 26 | 4,080 | 137 | 46 | 34 | 4,348 |
| 88 | 38 | 6,181 | 26 | 2 | 1 | 6,285 |
| 89 | 1 | 0 | 182 | 68 | 51 | 302 |

HORSEPOWER:
Refrigeration 0
Recompression 3,217
Total 3,217

RECOVERIES:
Ethane 87.6%
Propane 97.3%

The carbon dioxide and temperature relationships for the demethanizer of the process of FIG. 5 are set forth on the graph of FIG. 4. The example of FIG. 5 was designed generally for the processing of the same feed gas as processed in the processes of FIGS. 1 and 3, and may be compared therewith. In FIG. 4, the vapor temperature relationship for the liquid in the demethanizer of the process of FIG. 5 appears as line 90, while the vapor temperature relationship for the vapor is line 89.

EXAMPLE 3

Figure 6:
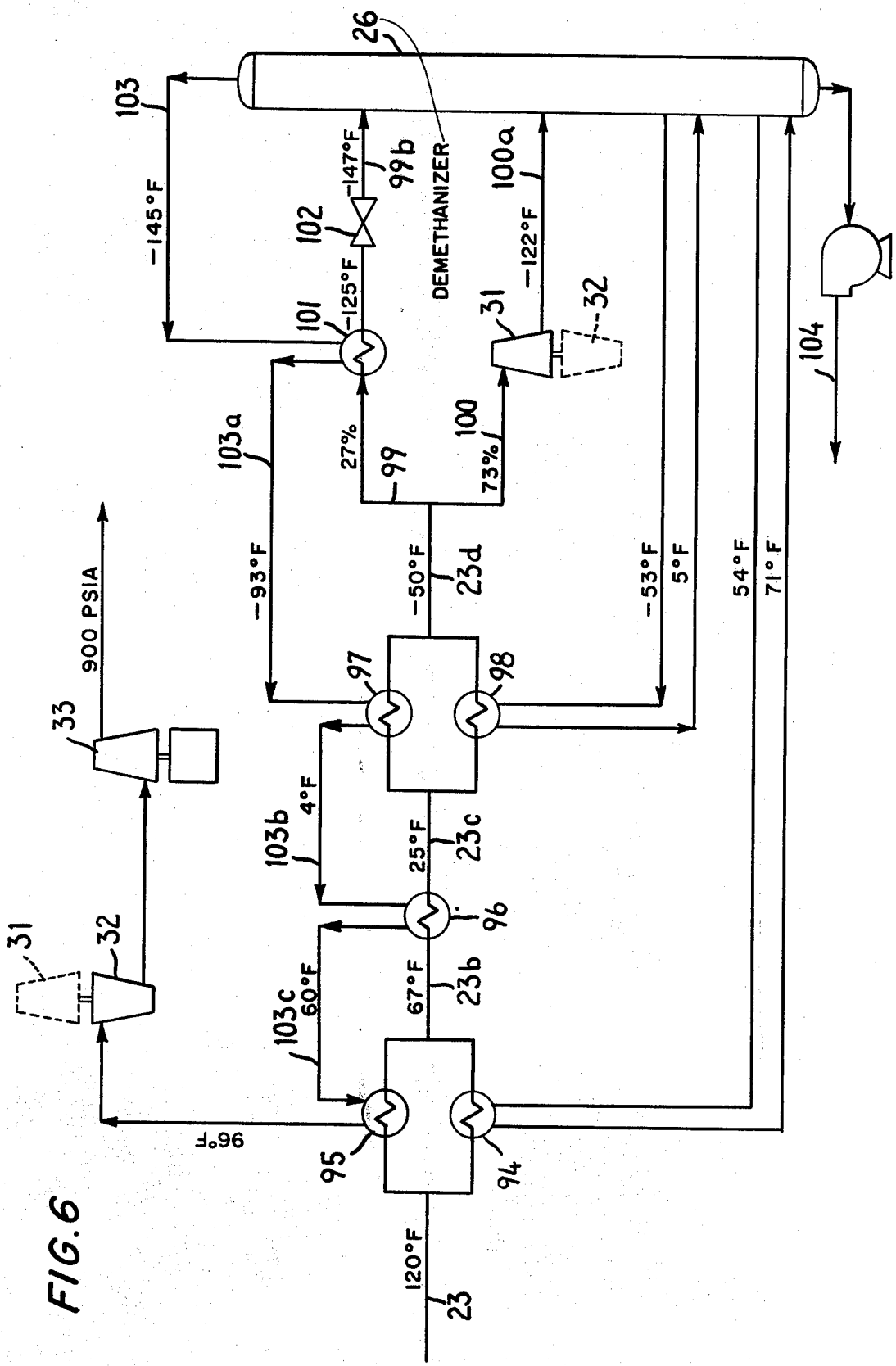

Example 3 is still further an example of the process of the present invention as set forth in the process of FIG. 6. The process of FIG. 6 follows substantially the process of FIG. 3, but illustrates a case in which only 27% of the feed is condensed and supplied as top column feed. Because of the change in heat duty relationships, the precooling heat exchangers are again modified.

Thus, in the process of FIG. 6, the incoming feed gas stream 23 is divided and cooled in heat exchanger 95 by residue gas stream 103c and demethanizer reboiler 94. The combined stream 23b is further cooled in exchanger 96 by residue gas stream 103b. Stream 23c is again split and is cooled once further by residue gas in exchanger 97 and demethanizer side reboiler 98.

The recombined stream 23d at −50° F. is divided into the two branches 99 and 100. Branch 99 is approximately 27% of the feed gas, the balance being branch 100. Feed gas branch 99 is condensed in exchanger 101 by residue gas stream 103, flashed to the demethanizer operating pressure of 360 psia in expansion valve 102, and supplied as demethanizer top feed (99b) at −147° F. Branch 100 is expanded in the conventional fashion through expansion engine 31 to the demethanizer operating pressure and supplied at −122° F. (100a) as the mid-column feed.

A stream flow summary for the process of FIG. 6 is set forth in the following table:

TABLE V
(FIG. 6)

STREAM FLOW SUMMARY - (LB.-MOLES/HR)

| Stream | Carbon Dioxide | Methane | Ethane | Propane | Butane+ | Total |
|---|---|---|---|---|---|---|
| 23 | 39 | 6,181 | 208 | 70 | 52 | 6,588 |
| 99 | 11 | 1,669 | 56 | 19 | 14 | 1,779 |
| 100 | 28 | 4,512 | 152 | 51 | 38 | 4,808 |
| 103 | 38 | 6,181 | 26 | 2 | 1 | 6,285 |
| 104 | 1 | 0 | 182 | 68 | 51 | 303 |

HORSEPOWER:
Refrigeration 0
Recompression 3,268
Total 3,268

RECOVERIES:
Ethane 87.6%
Propane 97.3%

The carbon dioxide and temperature relation found in the demethanizer of the process of FIG. 6 is set forth on the graph of FIG. 4. Line 105 represents the carbon dioxide/temperature relationships in the vapor phase of the demethanizer of FIG. 6 and line 104 represents the carbon dioxide/temperature relationship in the liquid for the demethanizer of the process of FIG. 6.

A comparison of the process of FIG. 1 with the processes of FIGS. 3, 5 and 6 illustrates an important aspect of the present invention. In the operation of a demethanizer, the heat balance required to maintain the column top temperature is important, since as the column top temperature rises, ethane losses increase significantly at any given pressure. The overall heat balance in the demethanizer depends upon the amount of refrigeration required to condense the portion of bottoms product not entering as a liquid, and the refrigeration required to cool the overhead vapor and the heat added to the column in reboiler and side reboilers. The necessary refrigeration is supplied by the feed streams. Consideration also must be given to the heat balance within column subsections, for example, between the upper mid-column feed and the column top. Within this section as a first approximation, the incoming refrigeration of the incoming top column feed should be sufficient to cool the vapors rising from the upper mid-column feed position to the column overhead residue gas and to condense the ethane and propane of the column vapors rising from the upper mid-column feed position. In an analogous manner, between upper mid-column feed and lower mid-column feed, in a column having two mid-column feeds, the liquid supplied at the upper mid-column feed position together with the liquid overflowing from the upper section of the column should contain approximately enough refrigeration to cool the vapors rising to the upper mid-column feed position from below, and to condense ethane and heavier components contained therein.

In the prior art processes such as the process of FIG. 1 when all of the refrigeration is supplied by cooling and expansion of a single gas stream (with or without partial condensation prior to expansion) icing can be a severe problem if high ethane recoveries are attempted with a feed gas containing the usual amount of carbon dioxide.

When the vapor stream is divided in accordance with the present invention, the refrigeration to the demethanizer is partly supplied by the upper branch (which is condensed and flash expanded into the column) and partly by the lower branch (which is expanded in the usual fashion). The top feed, although being less in weight, is colder and contains more liquid methane. This feed temperature and composition provide the necessary refrigeration to achieve the desired propane and ethane recovery. The warmer mid-column feed gases provided in the present invention prevent the buildup of a carbon dioxide concentration in the demethanizer column to a level where icing will occur.

In the present invention, the proportions of vapor directed to the upper and lower branches are selected in light of the column heat balance and the need to prevent icing. The amount of vapor directed to the upper branch should be sufficient to maintain the top column temperature required for the desired ethane recovery. The amount of vapor directed to the lower branch, and the temperature of that vapor, is selected to provide the dilution of carbon dioxide required to prevent icing. Whether the amount of feed vapor directed to the lower branch is sufficient to prevent icing is best determined by constructing a carbon dioxide-temperature diagram as in FIG. 4.

The optimum proportions of vapor to the upper and lower branches will depend, in any given case, on the temperature levels in the column, the amount of carbon dioxide in the feed, and the $CO_2$ concentrations which occur in the distillation column. For the illustrative processes of FIGS. 3, 5 and 6, it was found that a division of feed vapors between 40/60 and 27/73 (upper/lower branches) gave satisfactory results. If the vapor to the upper branch was increased to 50% or more, icing resulted because the amount of diluent vapor in the lower branch was too small. On the other hand, when the vapor to the lower branch was increased to 80% or more, and the same ethane recovery attempted, icing again resulted because the temperature of the lower branch had to be reduced to maintain column heat balance.

EXAMPLE 4

Figure 7:
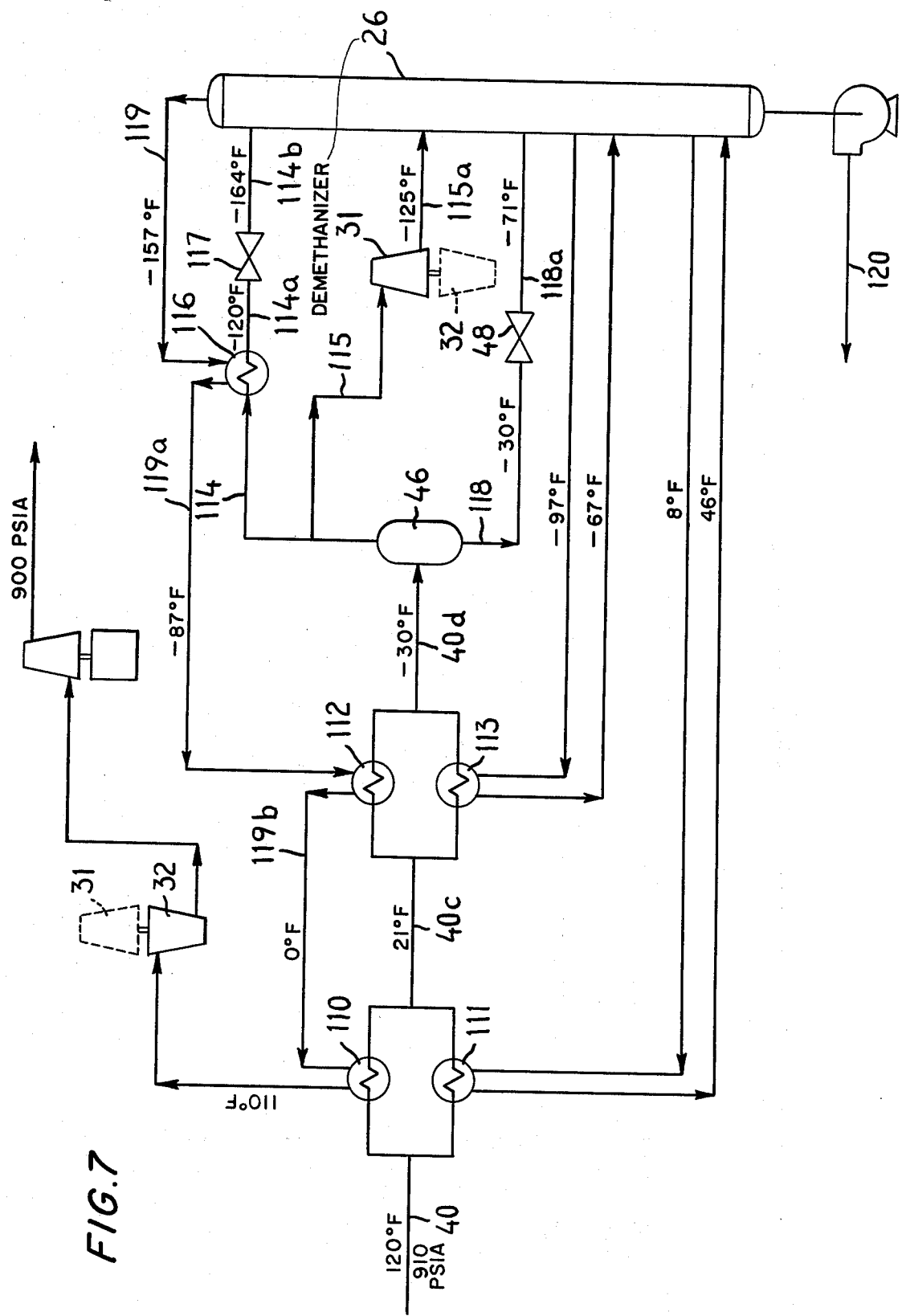

FIG. 7 illustrates another example of the present invention wherein the feed gas to the column is cooled and partially condensed. The condensate recovered is flash expanded into the column in the usual fashion, while the vapor portion recovered after partial condensation, is split and treated in accordance with the present invention.

The process flow plan of this example is set forth in FIG. 7. The stream conditions and process summary flow rates may be compared with the prior art example set forth in FIG. 2 and described below. Because of the change in the available heat duties growing out of the practice of the present invention, the preliminary heat exchange flow plan has been modified slightly.

Referring to FIG. 7, raw feed at a temperature of 120° F. and 910 psia (stream 40) is divided and cooled in heat exchanger 110 by residue gas stream 119b and in heat exchanger 111 in the demethanizer reboiler. The streams are recombined (stream 40c) at 21° F., and divided a second time. A portion is cooled in heat exchanger 112 by residue gas 119a and the remainder cooled in heat exchanger 113, the demethanizer side reboiler. The feed gas stream is recombined a second time (stream 40d) to form a partially condensed feed gas at −30° F. and a pressure about 900 psia. The vapor and liquid phases are separated in separator 46.

The vapors from separator 46 are divided in accordance with the present invention into two branches, branch 114 and branch 115. Branch 114 is cooled by residue gas 119 in heat exchanger 116 to −120° F. (stream 114a) and then flash expanded through valve 117. The demethanizer top feed (stream 114b) has a temperature of −164° F.

Branch 115 of the vapor remaining after partial condensation is expanded in the usual fashion through expansion engine 31 to −125° F. (stream 115a) and supplied as upper mid-column feed to demethanizer 26.

The liquid recovered in separator 46 (stream 118) is flash expanded in expansion valve 48 to −71° F. (stream 118a) and supplied to demethanizer 26 as a lower mid-column feed.

A stream flow summary for the process of FIG. 7 is set forth in the following table:

TABLE VI (FIG. 7)

STREAM FLOW RATE SUMMARY - (LB.-MOLES/HR)

| Stream | Carbon Dioxide | Methane | Ethane | Propane | Butane+ | Total |
|---|---|---|---|---|---|---|
| 40 | 12 | 1,447 | 90 | 36 | 43 | 1,647 |
| 114 | 3 | 386 | 20 | 6 | 2 | 423 |
| 115 | 8 | 993 | 53 | 15 | 6 | 1,087 |
| 118 | 1 | 68 | 17 | 15 | 35 | 137 |
| 119 | 10 | 1,445 | 14 | 36 | 0 | 1,488 |
| 120 | 2 | 2 | 76 | 6 | 43 | 159 |

| HORSEPOWER: | | |
|---|---|---|
| Refrigeration | | 0 |
| Recompression | | 1,186 |
| | Total | 1,186 |
| RECOVERIES: | | |
| Ethane | | 84.2% |
| Propane | | 99.0% |

It will be seen that the process of FIG. 7 is able to operate at a somewhat lower column top temperature than this process of FIG. 2. Accordingly, the ethane recovery in the process of this invention is somewhat greater, 84%, as contrasted with 79% for the process of the prior art. The horsepower requirement for the process of the present invention is only slightly greater than is the horsepower requirement of the prior art process, the greater horsepower being related to the increased ethane recovery which is obtained.

Figure 8:
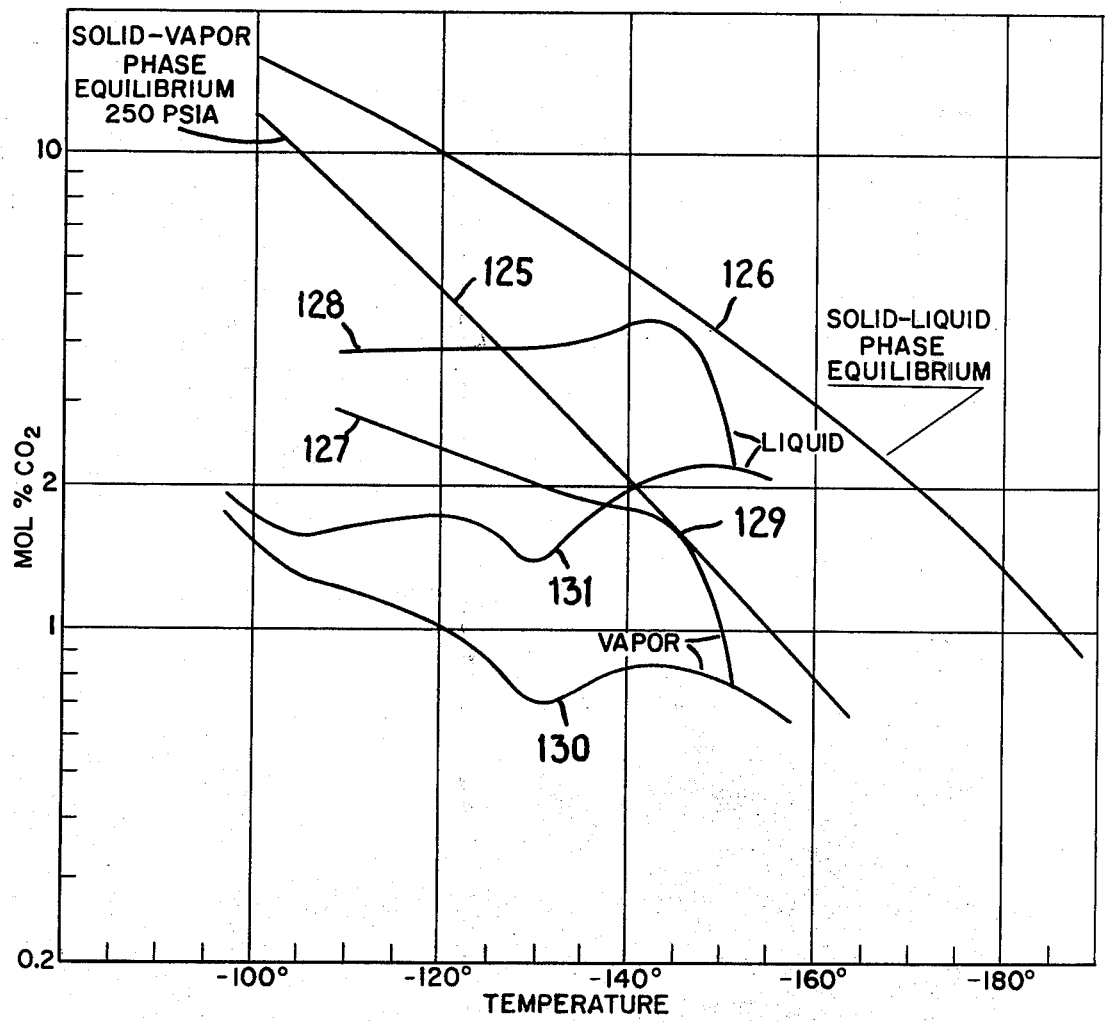
FIG. 8 is a $CO_2$-temperature diagram showing the effect of the present invention with respect to the processes of FIGS. 2 and 7.

The carbon dioxide-temperature relationships for the processes of FIGS. 2 and 7 are set forth in FIG. 8. Line 125 represents the icing equilibrium line for the vapor, while line 126 represents the icing equilibrium line for the liquid. Line 127 represents the carbon dioxide-temperature relationships for vapor flowing through the demethanizer column of the process of FIG. 2, while line 128 represents the liquid conditions. In the prior art process, icing occurs when the vapor conditions of carbon dioxide concentration and temperature reach the icing equilibrium conditions at point 129.

By contrast in the present invention, the temperature and carbon dioxide conditions do not approach icing, as can be seen by line 130 (representing the vapor conditions) and line 131 (representing the liquid conditions) in the process of FIG. 7. The process of FIG. 7 provides a safety factor relative to the closest approach to icing conditions about 1.5.

As can be seen from the carbon dioxide-temperature of FIG. 7, it would be impossible to operate the process of the prior art FIG. 2 at a low enough column top temperature to recover as much as 84% of the ethane and feed gas because of icing limitations.

EXAMPLE 5

As already indicated, the present invention may be applied with advantage to processes wherein a subcooled liquid feed is employed as the top column feed of the demethanizer. To illustrate this embodiment of the invention, reference is made to the following base case illustrated in FIG. 9 and example of invention illustrated in FIG. 10.

Base Case

Figure 9:
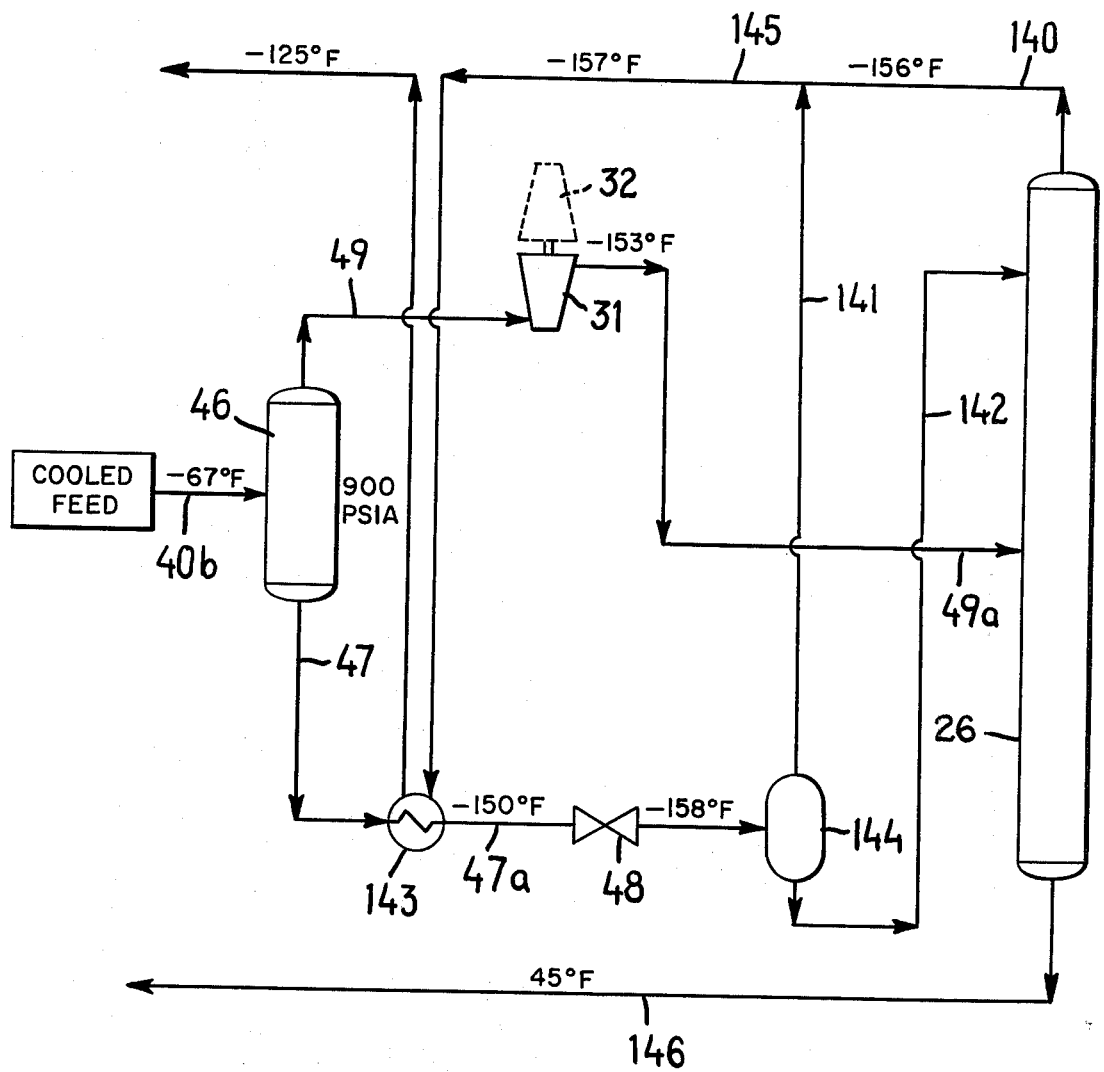
FIG. 9 is a flow diagram of a natural gas processing plant following the invention of our co-pending application, Ser. No. 728,962 filed Oct. 4, 1976.

Referring to FIG. 9, a partially-condensed raw feed gas 40b is obtained as described in FIG. 2 by heat exchange against residue gas and ethane products, and by heat exchange in the demethanizer reboiler and side reboiler. The partially-condensed stream 40b enters a high-pressure separator 46 where liquid and vapors are separated. Following first the vapors leaving separator 46, the vapors 49 enter a work expansion engine 31 in which mechanical energy is extracted from the vapor portion of the high-pressure feed. As that vapor is expanded from a pressure of about 900 psia to about 250 psia, work expansion cools the expanded vapor to a temperature of approximately −153° F. Expanded and partially-condensed vapor 49a is supplied as a mid-column feed to demethanizer 26 wherein the vapors rise and a major portion of the $C_2+$ hydrocarbons contained therein are absorbed by descending liquid. Demethanizer overhead 140, at a temperature of −156° F., is combined with vapor 141 from a flash vaporization described below to form residue gas stream 145. The combined cold residue gas stream 145 then passes through heat exchanger 143 and returns to the preliminary cooling stages as explained in FIG. 2. As illustrated, for example, in FIG. 2, where full refrigeration as contained in the still-cold residue gas is recovered and the residue gas is compressed in compressor 32 (see FIG. 2), it is driven by the work expansion engine 31 and then further compressed to a line pressure of 900 psia by supplementary compressor 33.

Turning to the liquid from separator 46, liquid stream 47 passes through heat exchanger 143 in heat exchange relation with the residue gas stream 145. The subcooled liquid 47a at −150° F., is expanded through an expansion valve 48 to a pressure of approximately 250 psia. During expansion, a portion of the feed will vaporize, resulting in cooling of the remaining liquid part. In the process illustrated in FIG. 9, the expanded stream leaving valve 48 reaches a temperature of −158° F. and enters a separator 144. The liquid portion 142 is separated and supplied to the fractionation column 26 as the top column feed.

A stream flow rate summary, recovery efficiency and expansion/compression requirements for the base case of FIG. 9 are set forth in the following table:

TABLE VII (FIG. 9)

STREAM FLOW RATE SUMMARY - (LB.-MOLES/HR)

| Stream | Carbon Dioxide | Methane | Ethane | Propane | Butane+ | Total |
|---|---|---|---|---|---|---|
| 40b | 12 | 1,447 | 90 | 36 | 43 | 1,647 |
| 47 | 4 | 280 | 42 | 25 | 39 | 391 |
| 49 | 8 | 1,167 | 48 | 11 | 4 | 1,256 |
| 142 | 3 | 251 | 42 | 25 | 39 | 361 |
| 141 | 1 | 29 | 0 | 0 | 0 | 30 |
| 145 | 8 | 1,445 | 10 | 1 | 0 | 1,483 |
| 146 | 4 | 2 | 80 | 35 | 43 | 164 |

HORSEPOWER:
  Refrigeration      0 BHP
  Recompression  1,177 BHP
            Total  1,177 BHP RECOVERIES:
  Ethane      89.1%
  Proapne    97.7%

Effect of Split Vapor Feed

Figure 10:
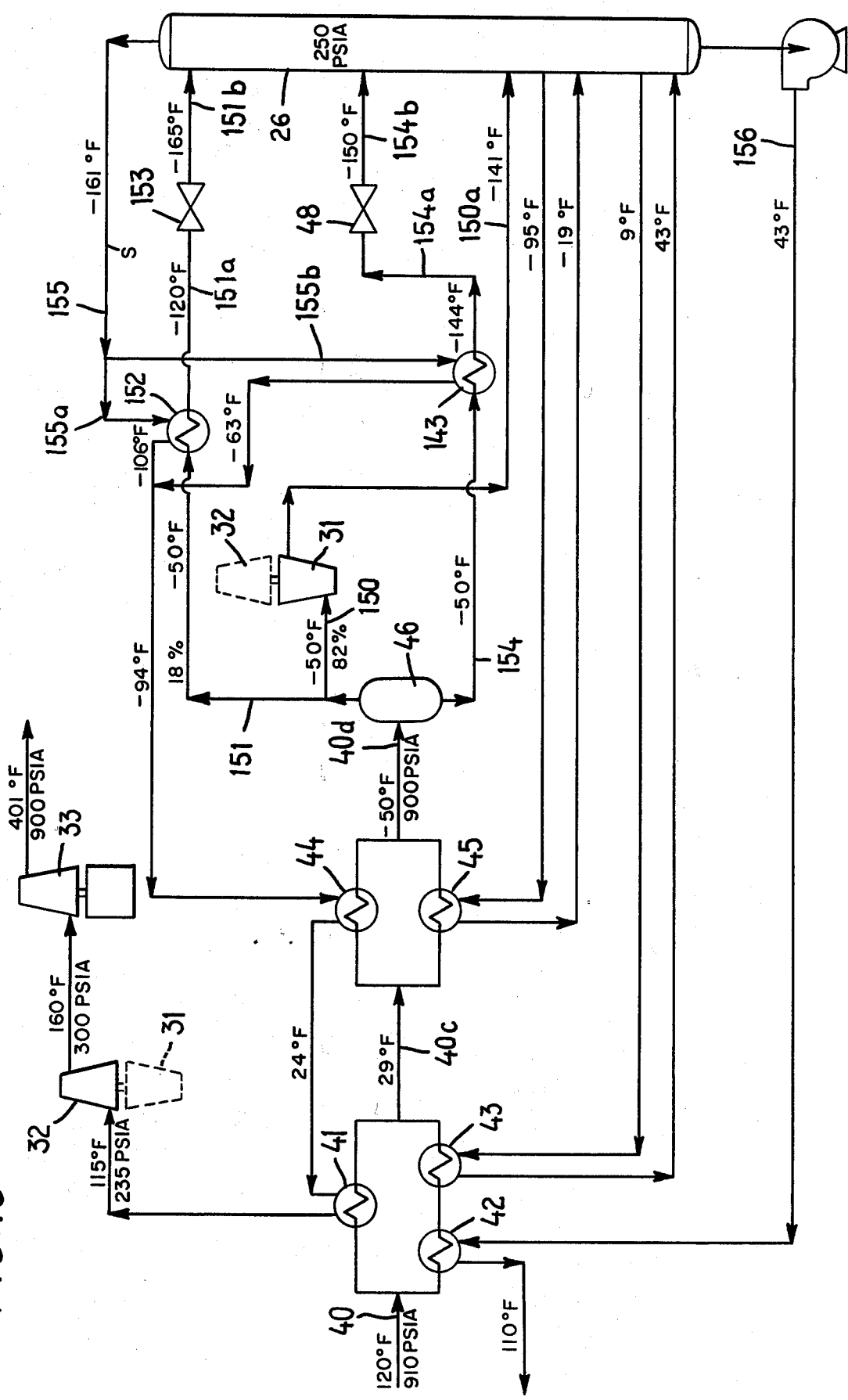
FIG. 10 is a flow diagram of a natural gas processing plant wherein the present invention is applied to the flow diagram of FIG. 9.

In accordance with the present invention, the process of FIG. 9 can be modified by division of the vapor stream from separator 46 into two portions. FIG. 10 represents a flow plan for the modified process. As in previous examples, division of the vapor feed requires some readjustment of the temperature conditions.

Referring to FIG. 10, raw feed 40 is taken into the process at a temperature of 120° F. and a pressure of 910 psia. The raw feed is divided and cooled first in heat exchangers 41, 42 and 43. The recombined stream 40c, at 29° F. is divided again and further cooled in heat exchangers 44 and 45 to provide a combined partially-condensed liquid feed at −50° F. and 900 psia. The partially-condensed feed 40d is supplied to separator 46 wherein the liquid and vapor portions are separated.

Referring first to the vapors recovered from separator 46, the vapors leaving separator 46 are divided into branches 150 and 151. Branch 150 is expanded in the usual manner through expansion engine 31 and supplied to demethanizer 26 as lower mid-column feed 150a at −141° F. Branch 151 is condensed in heat exchanger 152, by heat exchange against a portion 155a of demethanizer overhead stream 155, to a temperature of −120° F. The condensed stream 151a is flash expanded in expansion valve 153. The flash expanded stream 151b is cooled to a temperature of −165° F. and is supplied to demethanizer 26 as the top column feed.

Turning to the liquid stream 154 from separator 46, the liquid stream 154 at −50° F. is first subcooled in heat exchanger 143 by heat exchange against another portion 155b of demethanizer overhead. The subcooled liquid 154a at a temperature of −144° F. is flash expanded in expansion valve 48 and supplied as an upper mid-column feed 154b to demethanizer 26.

A product stream summary for the process of FIG. 10 is set forth in Table VIII.

TABLE VIII (FIG. 10)

STREAM FLOW RATE SUMMARY - (LB.-MOLES/HR)

| Stream | Carbon Dioxide | Methane | Ethane | Propane | Butanes+ | Total |
|---|---|---|---|---|---|---|
| 40 | 12 | 1,447 | 90 | 36 | 43 | 1,647 |
| 150 | 2 | 1,083 | 52 | 13 | 5 | 1,176 |

TABLE VIII-continued (FIG. 10)

| | | | | | | |
|---|---|---|---|---|---|---|
| 151 | 2 | 238 | 11 | 3 | 1 | 258 |
| 154 | 8 | 126 | 27 | 20 | 37 | 213 |
| 155 | 9 | 1,445 | 9 | 0 | 0 | 1,482 |
| 156 | 3 | 2 | 81 | 36 | 43 | 165 |

| HORSEPOWER: | | |
|---|---|---|
| Refrigeration | | 0 BHP |
| Recompression | | 1,208 BHP |
| | Total | 1,208 BHP |
| RECOVERIES: | | |
| Ethane | | 89.5% |
| Propane | | 99.2% |

Figure 11:
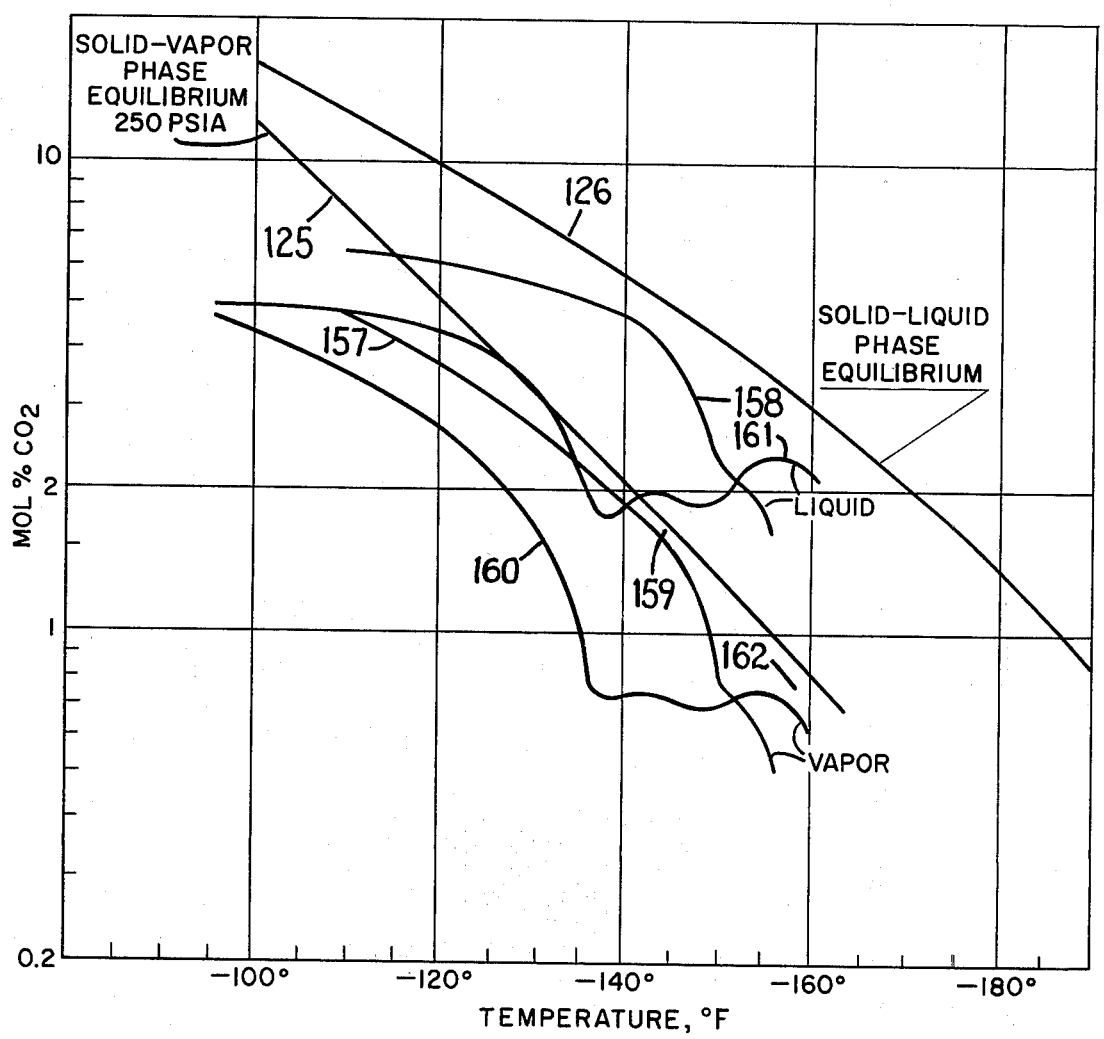
FIG. 11 is a $CO_2$-temperature diagram showing the effect of the present invention with respect to the processes of FIGS. 9 and 10.

FIG. 11 provides the data of the estimated carbon dioxide temperature relationship within demethanizer 26 for the processes of FIGS. 9 and 10. As in the case of FIG. 8, lines 125 and 126 show, respectively, the solid-vapor phase equilibrium for 250 psia and the solid-liquid phase equilibrium line. Line 157 shows the vapor phase-carbon dioxide temperatures within demethanizer 26 for the process of FIG. 9 and line 158 shows the liquid phase-carbon dioxide temperature relationship. As is apparent, line 157 closely approaches its related equilibrium line 125 at 159. In the region of 159 the margin of safety is only about 15%. Also appearing on FIG. 11 are the corresponding vapor and liquid conditions (160 and 161, respectively) for the process of FIG. 10. In the process of FIG. 10, the vapor-phase conditions approach the related equilibrium line generally in the region 162; however, the margin of safety is greater, about 30%, than that found in the process of FIG. 9.

We claim:

1. In a process for the separation of a feed gas containing methane and ethane into a volatile residue gas containing a major portion of said methane and a relatively less volatile fraction containing a major portion of said ethane, said feed gas containing hydrocarbons and at least 0.02 mole percent carbon dioxide, wherein methane and ethane together comprise a major portion of said feed gas, in said process
    (a) said feed gas being cooled under pressure to provide a cooled feed stream;
    (b) said cooled feed stream being expanded to a lower pressure whereby it is further cooled; and
    (c) said further cooled feed stream is fractionated at said lower pressure in a fractionation column, the overhead temperature of said fractionation column being maintained at a temperature whereby the major portion of said ethane is recovered in said relatively less volatile fraction;
    the improvement wherein prior to cooling said feed gas is divided into a first gaseous stream and a second gaseous stream prior to said step (a) and
    (1) said first stream is cooled to condense substantially all of it, and is thereafter expanded to said lower pressure;
    (2) said second stream is cooled under pressure to provide a cooled feed stream and is thereafter expanded to said lower pressure; and
    (3) said expanded first and second streams are thereafter supplied to said fractionation column at first and second feed points, respectively, said first feed point being the top liquid feed to said column, and said second feed point being at a mid-column feed position,
    the proportion of said feed gas comprising said second stream, and the temperature of said second gas stream prior to expansion being controlled sufficiently that the temperature and amount of the expanded vapor will be effective to reduce the risk of carbon dioxide icing in said fractionation column.

2. The improvement according to claim 1, wherein said fractionation column operates with a top column temperature below about −125° F.

3. In a process for the separation of a feed gas containing methane and ethane into a volatile residue gas containing a major portion of said methane and a relatively less volatile fraction containing a major portion of said ethane, said feed gas containing hydrocarbons and at least 0.02 mole percent carbon dioxide, wherein methane and ethane together comprise a major portion of said feed gas, in said process
    (a) said feed gas being cooled under pressure to provide a cooled feed stream;
    (b) said cooled feed stream being expanded to a lower pressure whereby it is further cooled; and
    (c) said further cooled feed stream is fractionated at said lower pressure in a fractionation column, the overhead temperature of said fractionation column being maintained at a temperature whereby the major portion of said ethane is recovered in said relatively less volatile fraction;
    the improvement wherein following cooling, said cooled feed stream under pressure is divided into a first and second gaseous streams; and
    (1) said first stream is cooled to condense substantially all of it, and is thereafter expanded to said lower pressure;
    (2) said second stream is expanded to said lower pressure; and
    (3) said expanded first and second streams are thereafter supplied to said fractionation column at first and second feed points, respectively, said first feed point being the top liquid feed to said column, and said second feed point being at a mid-column feed position,
    the proportion of said feed gas comprising said second stream, and the temperature of said second stream being sufficient to reduce the risk of carbon dioxide icing in said column, and the temperature of said first stream being effective to maintain said overhead temperature of the fractionation column at a temperature whereby the major portion of said ethane is recovered in said relatively less volatile fraction.

4. The improvement according to claim 3, wherein said fractionation column operates with a top column temperature below about −125° F.

5. In a process for the separation of a feed gas containing methane and ethane into a volatile residue gas containing a major portion of said methane and a relatively less volatile fraction containing a major portion of said ethane, said feed gas containing hydrocarbons and at least 0.02 mole percent carbon dioxide, wherein methane and ethane together comprise a major portion of said feed gas, in said process
    (a) said feed gas being cooled under pressure to provide a cooled feed stream;
    (b) said cooled feed stream being expanded to a lower pressure whereby it is further cooled; and
    (c) said further cooled feed stream is fractionated at said lower pressure in a fractionation column, the overhead temperature of said fractionation column being maintained at a temperature whereby the major portion of said ethane is recovered in said relatively less volatile fraction;

the improvement wherein said feed gas is cooled sufficiently to partially condense it; and (1) said partially condensed feed is separated thereby to provide a feed gas vapor and a condensed feed;

(2) said feed gas vapor is thereafter divided into first and second gaseous streams;

(3) said first gaseous stream is cooled to condense substantially all of it, is thereafter expanded to said lower pressure and is supplied to said fractionation column at a first feed point, said first feed point being the top liquid feed to the column;

(4) said second gaseous stream is expanded to said lower pressure in a work expansion machine and is supplied to said fractionation column at said second feed point, said second feed point being a mid-column feed position;

(5) said condensed feed is expanded to said lower pressure and supplied to said fractionation column at a third feed point, said third feed point being at a mid-column feed position, the proportion of said feed gas comprising said second stream, and the temperature of said second stream being sufficient to reduce the risk of carbon dioxide icing in said column, and the temperature of said first stream being effective to maintain said overhead temperature of the fractionation column at a temperature whereby the major portion of said ethane is recovered in said relatively less volatile fraction.

6. The improvement according to claim 5, wherein said feed case contains less than about 4 gallons per thousand cubic feed of $C_2+$ components.

7. The improvement according to claim 5, wherein said fractionation column operates with a top column temperature below about $-125°$ F.

* * * * *